Patented May 1, 1934

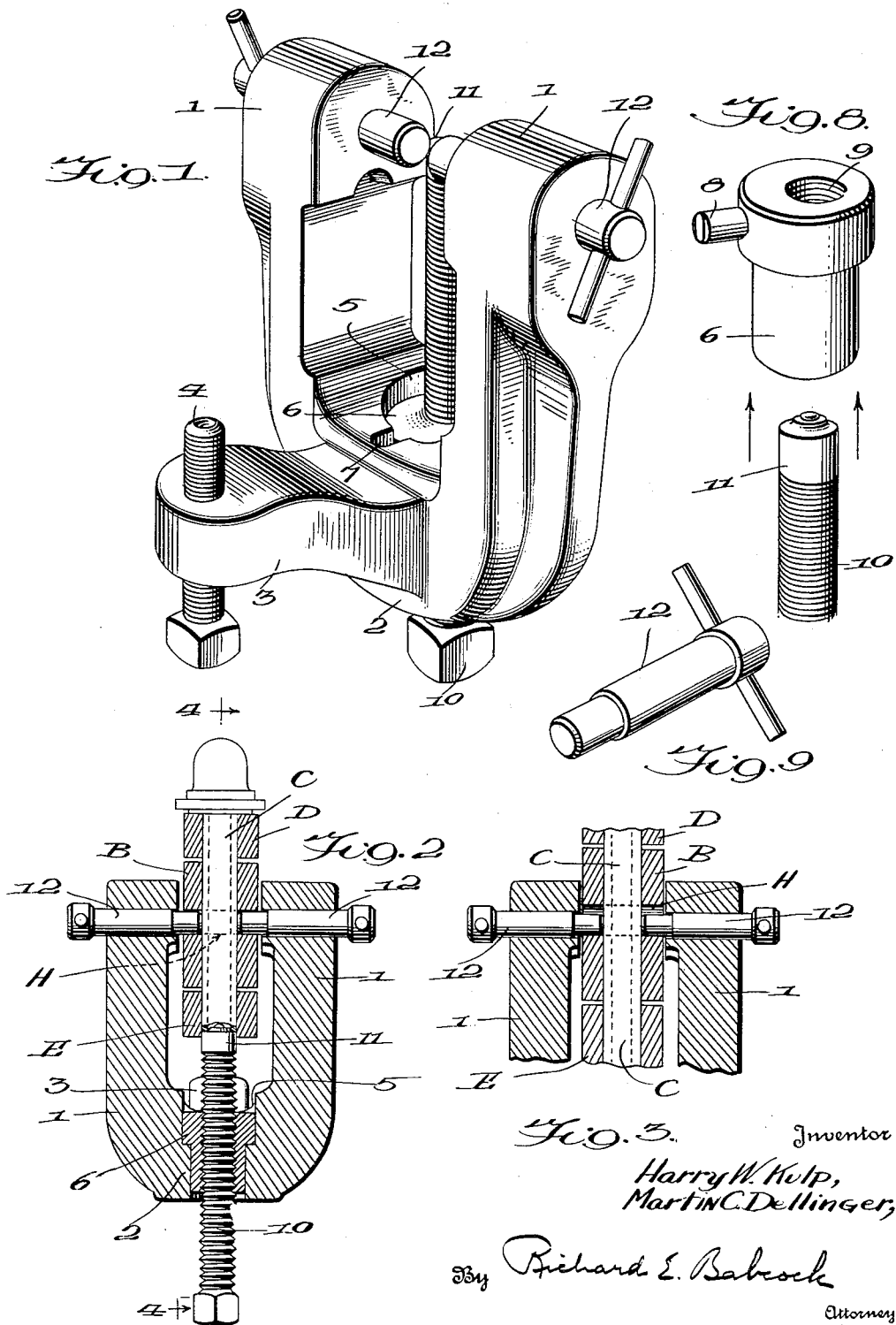

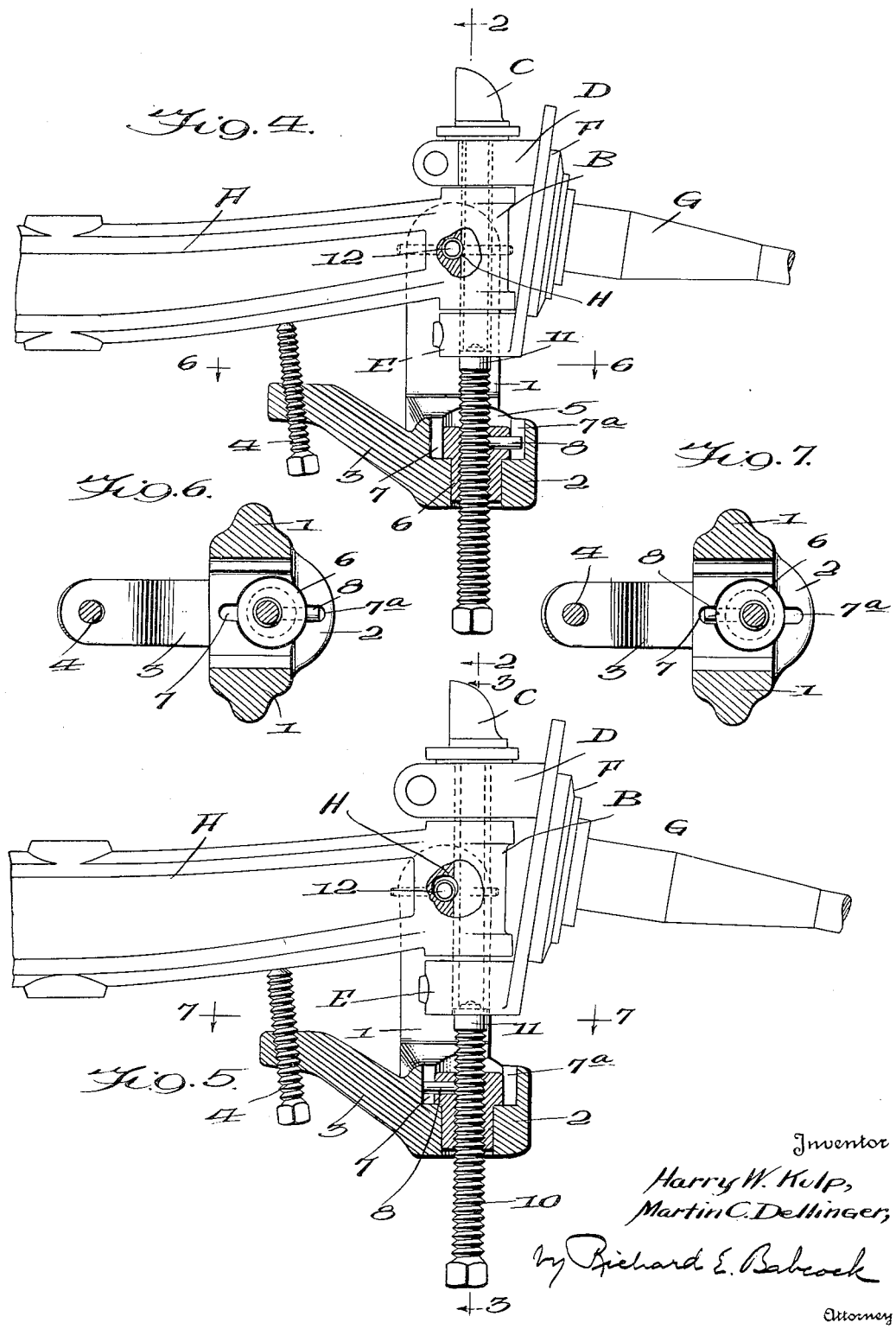

1,956,924

UNITED STATES PATENT OFFICE 1,956,924

TOOL FOR EXTRACTING KING-PINS

Harry W. Kulp and Martin C. Dellinger, Lancaster, Pa.

Application December 3, 1932, Serial No. 645,598

8 Claims. (Cl. 29—86.1)

This invention relates to jack screw-type king pin or spindle bolt removers or ejectors.

In at least one make of automobile now on the market the wheel stub axles or spindles are provided with vertically bored lugs which span the end of the axle and a spindle bolt or king pin passes through the registering lugs of the spindle and the bore in the end of the axle. This king pin is transversely notched out and a transversely extending pin or bolt in assembled relation extends through a corresponding bore in the axle and into the said notch and so holds the king pin against both endwise and rotary movement. In the make of automobile in mind this same construction is used both for passenger cars and for trucks, but the parts are made larger and stronger for the one use than the other, with the result that there is a greater distance between the axis of bore for the anchoring bolt and the axis, extending at right angles thereto, of the bore for the king pin.

The primary objects of the present invention are to provide a simple sturdy tool having slidably adjustable parts for a common axis and adapted to extend into the said anchoring bolt bore of the axle; to provide in association with a vertically socketed body a removable and replaceable ejector screw carrying and supporting block, said block being provided with a vertically screw-threaded bore of which the axis is disposed to one side of the axis of said block, and said block and the internal face of said socket being of corresponding size and shape and of such shape that said block may be turned to any one of several positions about its axis and as so turned received in said socket, said block and socket having their opposed faces of such form that the face of said socket will support said block in said body against the thrust of said screw; and to form said block and socket in such manner that they will interlock with each other in any one of several positions of adjustment of the block in said socket.

In this application we show and describe only the preferred embodiment of our invention simply by way of illustration of the practice thereof, as by law required. However, we are well aware that our invention is capable of other embodiments and that the several details thereof may be modified in various ways, all without departing from our said invention and, therefore, the drawings and description herein are to be considered as merely illustrative and not as exclusive.

In the accompanying drawings:

Figure 1 represents a perspective view of a tool embodying our invention;

Figure 2, a view on the line 2—2 of Fig. 4, showing the tool of our invention as operatively applied to remove the king pin from an automobile;

Figure 3, a fragmentary sectional view on the line 3—3 of Fig. 5, showing our invention as applied to corresponding parts of the same general construction but of larger dimensions, and wherein the anchoring bolt bore H is of a greater diameter than is the case in Fig. 2, and consequently wherein the distance between the axis of the said bore H and the axis of the bore for the king pin C are at a greater distance than the axes of the same parts in Fig. 2;

Figure 4, a side elevation of an automobile front axle A and spindle G and associated parts, with a tool embodying our invention being shown as applied thereto, said tool being illustrated in section on the line 4—4 of Fig. 2;

Figure 5, a view corresponding to Fig. 4, the axle A, spindle G and associated parts being of greater size, and the anchoring bolt bore H being of greater diameter than the corresponding parts and bore in Fig. 4, with a greater distance between the axis of the bore H and the axis of the vertical king pin bore, and with the eccentrically bored screw supporting block 6 moved through half a revolution to bodily move the ejecting screw to compensate for the difference;

Figure 6, a sectional view on the line 6—6 of Fig. 4, looking in the direction of the arrows;

Figure 7, a sectional view on the line 7—7 of Fig. 5, looking in the direction of the arrows;

Figure 8, a perspective view of the eccentrically bored block 6 and the ejecting screw 10 and a portion of the screw 10 in superposed relationship; and Figure 9, a perspective view of one of the anchoring parts or pins entirely removed from its corresponding arm 1.

Referring now in detail to the drawings, A designates the front axle; B, the vertically bored extreme end portion of the end boss of the front axle; C, the spindle bolt or king pin; D, the upper lug of the wheel spindle F; E, the lower lug of the wheel spindle; F, the wheel spindle comprising said lugs and the stub axle G; H, a transverse bore extending through the end portion of the axle A and intersecting the king pin C, which is notched out in well known manner to receive with said bore H, and to be engaged and locked in position by, a transverse bolt or pin, not shown, disposed in the bore H.

All the foregoing parts are old and well known and are merely thus briefly referred to and illustrated to make the construction, operation and function of our invention easily understood, but more detailed construction of said parts is not believed to be necessary or desirable.

In the exemplification of our invention illustrated in the drawings it is embodied in a body portion, a block removably and adjustably associated with said body, anchoring and centering means movably associated with said body, and an ejecting screw carried by said block.

Said body comprises two arms 1 connected together at their lower ends by a crotch 2 from which extends a lever or finger 3. Said lever or finger 3 is upwardly inclined for the major portion of its length and extends at right angles to the arms 1 and in a plane between the same and has its extreme free end flattened and provided with a threaded bore to receive an adjusting screw 4 adapted in operation to bear against the under face of the axle A.

The upper end portions of the arms 1 are spaced apart a sufficient distance to just snugly slidably accommodate between them the largest size of axle end boss B which the tool is designed to service and are formed with transverse bores having a common axis to slidably receive the anchoring pins 12, the inner ends of which are to engage in the corresponding opposite end portions of the anchoring bolt bore H.

The crotch 2 is formed with a vertically extending opening 5 preferably having its axis disposed on the side of the axis of the pins 12 distant from the arm 3 and is of such shape in cross section as to receive the correspondingly shaped removable block 6 in any one of several positions of angular adjustment and has its inner face or wall of such shape in a vertical direction as to slidably receive said block 6 from the top between the arms 1 and to engage and support the opposed face of said block 6. As shown in the drawings, said opening 5 is a two-diameter cylindrical bore, the smaller diameter portion of the bore being in the lower part of the crotch 2, the difference in diameter between the two portions resulting in the formation of an upwardly presented annular shoulder, and similarly the block 6 is a two-diameter externally cylindrical block of such size as to make a snug sliding fit in the opening or bore 5.

The block 6 is formed with an eccentrically disposed internally screw-threaded vertical bore 9 through which is threaded the thrust or ejecting screw or jack screw 10, so as to be carried and supported by said block 6. A freely rotatable end bearing or thrust cap 11 may be mounted on the upper or thrust end of the screw 10 to engage the lower end of the king pin C and as so engaged being held thereby against rotation, while permitting the rotation of the screw 10 incident to the ejecting operation and thus protecting the lower end of the king pin C against injury. Such construction or provision of the freely rotatable cap 11 is old and well known and so will not be further considered here.

The crotch 2 and the block 6 are provided with cooperating interengaging or interlocking means permitting the angular adjustment of said block about its axis to several positions with relation to, and in, said crotch 2, while preventing partial rotary relative movement between said crotch 2 and block 6 in any position of adjustment, and such interengaging or interlocking may be provided for in any one of a number of suitable and convenient constructions. In the drawings, the crotch 2 is shown as provided with vertically extending recesses or slots 7 and 7ª extending laterally from the bore 5 and in communication therewith, and the block 6 is shown as provided with a radially projecting pin 8 which may be integral therewith or rigid therewith and so associated therewith as to be in use operatively integral, said pin 8 being received slidably in one of said recesses or slots 7 and 7ª according to the position of adjustment desired for the thrust screw 10.

In the embodiment illustrated the body comprising the arms 1, crotch 2 and arm 4 is one integral piece of metal, and this is the preferred form, and preferably this body will be a malleable casting. However, it is not essential that the arms 1, crotch 2 and lever or finger 3 should be integral or of cast metal, it sufficing if, as operatively used, said arms 1, crotch 2 and lever 3 are held rigid against movement with relation to each other.

In the drawings in all views except Fig. 1 all parts of the tool are drawn to a scale of one-third full size from an actual commercial embodiment of the invention, although no attempt has been made to draw to scale the axle A, spindle G and associated parts.

In use, assuming that the king pin C of a car having a small diameter anchoring bolt bore H in its axle is to be removed, the wheel hub and brake assembly are removed, the drag links are disconnected and the anchoring bolt is removed from the bore H and after the parts are freely oiled, the tool shown and described herein is to be applied with the block 6 adjusted so that the pin 8 lies in recess or slot 7ª, so that the axis of the jack screw 10 will lie in its position of adjustment closest to the axis of the slidable anchoring pins 12. With the parts thus adjusted the pins 12 are pulled outwardly sufficiently so that their inner ends do not project beyond the inner faces of the arms 1 and said arms 1 are then slid upwardly on opposite sides along the boss B until the ends of the pins 12 register with the bore H, at which point the pins 12 are to be shoved into the adjacent end portions of said bore H. Thereafter the jack, thrust or ejecting screw 10 is to be turned up until the head 11 freely rotatable on said screw 10 is in flat engagement with the lower end of the king pin C. Thereafter the screw 4 is to be turned up until it engages against the under face of the axle A, thus holding the tool as a whole against swinging movement about the common axis of the pins 12 under the influence of the thrust of jack screw 10 and so maintain proper alignment between the king pin C and the jack, ejecting, or thrust screw 10 throughout the upward movement of the latter into the king pin bore and so preventing any damage to said bore or the jamming of the screw 10 therein.

To remove the king pin C from the automobile in view having the larger size axle A, spindle G and associated parts and wherein accordingly the anchoring bolt bore H is of larger diameter to accommodate the correspondingly larger and heavier anchoring bolt, the operations will be the same as above described except that due to the larger diameter bore H the axis of the bore H will be disposed at a slightly greater distance from the axis of the bore in which the king pin C is located, and consequently in order to avoid jamming of the screw 10 in said king pin bore, it is essential that the king pin must be moved as a whole so that in its new position of adjustment required its axis will lie in a different position from, but parallel to, the position said axis previously occupied and therefore the block 6 is to be lifted endwise until the pin 8 is free of the slot or recess 7ª, when said block 6 is to be turned through half a revolution until the pin 8 registers with, and will enter the slot or recess 7, at which time the block 6 is to be dropped down in the bore 5. This results, due to the eccentric mounting of the screw 10 in the block 6, in shifting the axis of the pin 10 to its extreme distance away from the common axis of the pins 12 and from the axis of the bore H.

Having thus described our invention, what we claim as new and desire to secure by Letters Patent is:

1. A device for removing a king-pin from the vertical bores of its cooperating wheel spindle and axle boss which is transversely bored at right angles to said vertical bore to removably receive an anchoring bolt to lock the king-pin in normal operative position, said device comprising a body, anchoring pins adapted to extend through said body and into the adjacent registering end portions of the transverse anchoring bolt bore in the axle, and an adjusting screw, in combination with a centering block formed with an eccentric internally screw-threaded bore, and a jack-screw extending through said block and engaging the screw thread of said bore thereof, said body comprising two spaced parallel arms integral with a connecting crotch and an adjusting lever integral with said crotch and extending therefrom to lie beneath the adjacent portion of an axle, said arms being formed with bores having a common axis and adapted to slidably receive said anchoring pins, said adjusting lever being formed with an internally screw-threaded bore through which said adjusting screw is threaded, said crotch being formed with a two-diameter vertical cylindrical bore having an upwardly presented annular shoulder, and further formed with two peripherally spaced vertically extending locking recesses communicating with said bore and extending through the top of said crotch, and said block corresponding in shape to said crotch bore and being of such size as to be snugly slidably received therein and being provided with a part rigid therewith and extending laterally therefrom and being of such size and shape as to be selectively received in said recesses to lock said block in either one of its two angular positions of adjustment with relation to said body.

2. A device for removing a king-pin from the vertical bores of its cooperating wheel spindle and axle boss which is transversely bored at right angles to said vertical bore to removably receive an anchoring bolt to lock the king-pin in normal operative position, said device comprising a body, anchoring pins adapted to extend through said body and into the adjacent registering end portions of the transverse anchoring bolt bore in the axle, and an adjusting screw, in combination with a centering block formed with an eccentric internally screw-threaded bore, and a jack-screw extending through said block and engaging the screw thread of said bore thereof, said body comprising two spaced parallel arms integral with a connecting crotch and an adjusting lever integral with said crotch and extending therefrom to lie beneath the adjacent portion of an axle, said arms being formed with bores having a common axis and adapted to slidably receive said anchoring pins, said adjusting lever being formed with an internally screw-threaded bore through which said adjusting screw is threaded, said crotch being formed with a vertical bore, and further formed with two peripherally spaced vertically extending locking recesses communicating with said bore and extending through the top of said crotch, and said block corresponding in shape to said crotch bore and being of such size to be snugly slidably received therein and being provided with a part rigid with it and extending laterally therefrom to be selectively received in said recesses to lock said block in either one of its two angular positions of adjustment with relation to said body.

3. A device for removing a king-pin from the vertical bores of its cooperating wheel spindle and axle boss which is transversely bored at right angles to said vertical bore to removably receive an anchoring bolt to lock the king-pin in normal operative position, said device comprising a body, anchoring pins adapted to extend through said body and into the adjacent registering end portions of the transverse anchoring bolt bore in the axle, and an adjusting screw, in combination with a centering block formed with an eccentric internally screw-threaded bore, and a jack-screw extending through said block engaging the screw thread of said bore thereof, said body comprising two spaced parallel arms rigid with a connecting crotch and an adjusting lever rigid with said crotch and extending therefrom to lie beneath the adjacent portion of an axle, said arms being formed with bores having a common axis and adapted to slidably receive said anchoring pins, said adjusting lever being formed with an internally screw-threaded bore through which said adjusting screw is threaded, said crotch being formed with a vertical socket, said block corresponding in shape to said crotch socket and being of such size to be snugly received therein and said socket and block being formed to interlock in any one of several positions of relative angular adjustments about the axis of said block to prevent partial relative rotary movements between said socket and block.

4. A device for removing a king-pin from the vertical bores of its cooperating wheel spindle and axle boss which is transversely bored at right angles to said vertical bore to removably receive an anchoring bolt to lock the king-pin in normal operative position, said device comprising a body, an anchoring pin adapted to extend through a portion of said body and into the transverse anchoring bolt bore in the axle, and an adjusting screw, in combination with a centering block formed with an eccentric internally screw-threaded bore, and a jack-screw extending through said block engaging the screw thread of said bore thereof, said body comprising two spaced parallel arms rigid with a connecting crotch and an adjusting lever rigid with said crotch and extending therefrom to lie beneath the adjacent portion of an axle, one of said arms being formed with a bore to slidably receive said anchoring pin, said adjusting lever being formed with an internally screw-threaded bore through which said adjusting screw is threaded, said crotch being formed with a socket, said block corresponding in shape to said crotch socket and being received and supported thereby in one of several selective positions of angular adjustment, and said socket and block being of interlocking construction whereby they will interlock with each other in each of said several positions of angular adjustment to prevent partial relative rotary movement between said socket and block.

5. A device for removing a king-pin from the vertical bores of its cooperating wheel spindle and axle boss which is transversely bored at right angles to said vertical bore to removably receive an anchoring bolt to lock the king-pin in normal operative position, said device comprising a body, and an anchoring pin adapted to extend through said body and into the transverse anchoring bolt bore in the axle, in combination with a centering block formed with an eccentric internally screw-threaded bore, said body comprising two spaced parallel arms rigid with a connecting crotch, one of said arms being formed with a bore to slidably receive said anchoring pin, said crotch being formed with a two-diameter vertical cylindrical bore having an upwardly presented annular shoulder, said block corresponding in shape to said crotch bore and being of such size as to be snugly slidably received therein in one of several positions of angular adjustment, and said socket and block being of interlocking construction whereby they will interlock with each other in each of said several positions of angular adjustment to prevent partial relative rotary movement between said socket and block.

6. A device for removing a king-pin from the vertical bores of its cooperating wheel spindle and axle boss which is transversely bored at right angles to said vertical bore to removably receive an anchoring bolt to lock the king-pin in normal operative position, said device comprising a body, and an anchoring pin adapted to extend through said body and into the transverse anchoring bolt bore in the axle, in combination with a centering block formed with an eccentric internally screw-threaded bore, said body comprising two spaced parallel arms rigid with a connecting crotch, one of said arms being formed with a bore to slidably receive said anchoring pin, said crotch being formed with a socket, said block corresponding in shape to said crotch socket and being received and supported thereby in one of several selective positions of angular adjustment, and said socket and block being of interlocking construction whereby they will interlock with each other in each of said several positions of angular adjustment to prevent partial relative rotary movement between said socket and block.

7. A device for removing a king-pin from the vertical bores of its cooperating wheel spindle and axle boss which is transversely bored at right angles to said vertical bore to removably receive an anchoring bolt to lock the king-pin in normal operative position, said device comprising a body, and an anchoring pin adapted to extend through said body and into the transverse anchoring bolt bore in the axle, in combination with an adjustable centering block, said body comprising two spaced parallel arms rigid with a connecting crotch, one of said arms being formed with a bore to slidably receive said anchoring pin, said adjustable block being movably mounted for adjustment in said crotch and being provided with an internally screw-threaded bore, and a jack screw extending through said bore and engaging the thread thereof.

8. A device for removing a king-pin from the vertical bores of its cooperating wheel spindle and axle boss, said device comprising a body, in combination with an adjustable centering block movably mounted in said body and adapted to be moved to any one of several positions of adjustment therein, said block being formed with an internally screw-threaded bore, and a jack screw extending through said bore and engaging the thread thereof.

HARRY W. KULP.
MARTIN C. DELLINGER.